United States Patent
Sun et al.

(10) Patent No.: US 9,631,444 B1
(45) Date of Patent: Apr. 25, 2017

(54) KICK INFORMATION IDENTIFICATION APPARATUS AND METHOD ASSISTED FOR WELLBORE PRESSURE CONTROL DURING HORIZONTAL DRILLING

(71) Applicant: China University of Petroleum (East China), Qingdao, Shandong (CN)

(72) Inventors: Baojiang Sun, Shandong (CN); Xiaohui Sun, Shandong (CN); Zhiyuan Wang, Shandong (CN); Jianliang Zhou, Beijing (CN)

(73) Assignee: China University of Petroleum (East China), Shandong (CN)

( * ) Notice: Subject to any disclaimer, the term of this patent is extended or adjusted under 35 U.S.C. 154(b) by 0 days.

(21) Appl. No.: 15/298,041

(22) Filed: Oct. 19, 2016

(30) Foreign Application Priority Data

Sep. 12, 2016 (CN) .......................... 2016 1 0817103

(51) Int. Cl.
| | | |
|---|---|---|
| *G01V 1/40* | (2006.01) | |
| *E21B 21/08* | (2006.01) | |
| *E21B 47/06* | (2012.01) | |
| *E21B 47/12* | (2012.01) | |
| *G01V 9/00* | (2006.01) | |

(52) U.S. Cl.
CPC .............. *E21B 21/08* (2013.01); *E21B 47/06* (2013.01); *E21B 47/065* (2013.01); *E21B 47/12* (2013.01); *G01V 9/005* (2013.01)

(58) Field of Classification Search
CPC ........ E21B 21/08; E21B 47/06; E21B 47/065; E21B 47/12; G01V 9/005

USPC ............................................................ 702/9
See application file for complete search history.

(56) References Cited

U.S. PATENT DOCUMENTS

| | | | | |
|---|---|---|---|---|
| 3,443,643 A | * | 5/1969 | Jones | ...................... E21B 21/08 138/45 |
| 4,881,406 A | * | 11/1989 | Coury | ................... E21B 47/065 166/250.07 |
| 5,006,845 A | * | 4/1991 | Calcar | ................... E21B 21/001 166/336 |
| 8,776,894 B2 | * | 7/2014 | Orbell | ................... E21B 17/085 166/345 |
| 2012/0103619 A1 | * | 5/2012 | Schroeder | ............... E21B 21/10 166/332.2 |

(Continued)

*Primary Examiner* — Jonathan C Teixeira Moffat
*Assistant Examiner* — Xiuquin Sun
(74) *Attorney, Agent, or Firm* — Calfee, Halter & Griswold LLP (57) ABSTRACT

The present invention provides a measuring unit, a kick information identification apparatus and method, and relates to the oil and gas well engineering field. The measuring unit comprises: a throttling device, mounted on a drill stem; sensors, arranged at the two sides of the throttling device, and configured to sense the pressure and/or temperature at the two sides of the throttling device; and a signal transmitter, configured to transmit the pressure and/or temperature values. The present invention employs a throttling device and measures the pressure drop and/or temperature difference across the throttling device, and can identify kick information successfully according to the pressure drop and/or temperature difference. Even in the case of horizontal wells where the flow and pressure variations are not apparent, the present invention can still attain a good kick information identification effect.

12 Claims, 4 Drawing Sheets

(56) References Cited

U.S. PATENT DOCUMENTS

2014/0048331 A1\* 2/2014 Boutalbi ................ E21B 21/08
                                                                                                    175/38
2015/0211362 A1\* 7/2015 Rogers ................... E21B 47/06
                                                                                                    73/152.22

\* cited by examiner

KICK INFORMATION IDENTIFICATION APPARATUS AND METHOD ASSISTED FOR WELLBORE PRESSURE CONTROL DURING HORIZONTAL DRILLING

CROSS REFERENCE TO RELATED APPLICATIONS

This application claims priority to Chinese Application No. 201610817103.6, filed on Sep. 12, 2016, entitled "A kick Information Identification Apparatus and Method Assisted for Wellbore Pressure Control during Horizontal Drilling", which is specifically and entirely incorporated by reference.

FIELD OF THE INVENTION

The present invention relates to the oil and gas well engineering field, in particular to a measuring unit, a kick information identification apparatus and method.

BACKGROUND OF THE INVENTION

Recently, the reservoir characteristics and well structures in oil and gas well drilling become more and more complex, and oil and gas kick accidents happen frequently, resulting in increase of non-operation time and drilling cost in well drilling. After kick happens in a well, the formation fluids (oil, gas, and water) may invade into the wellbore, be mixed with the drilling fluid and migrate along the wellbore. If the kick fluid is a gas, subjecting to the influence on the environment change on pressure and temperature, it may have severe phase transition, rise and expansion in the migration process, bringing a serious challenge to wellbore pressure control. Therefore, it is very important to identify and diagnose kick information timely, to ensure safe and efficient well drilling.

The invasion of formation fluids may result in change of flow behaviors and physical parameters of the fluid in the wellbore. Based on that fact, existing kick detection techniques have been developed, and these kick detection techniques can be categorized into: diagnostic methods based on flow measurement, including drilling fluid pit increment method, outlet flow difference method, and downhole microflow measurement method, etc.; diagnostic method based on pressure and temperature measurement, including Annulus Pressure While Drilling (APWD), Logging While Drilling (LWD), and Rapid Annulus Temperature (RAT), etc.; diagnostic methods based on measurement of gas void fraction in fluid, including acoustic measurement method, resistivity measurement method, and natural gamma monitoring method (LWD), etc.

To avoid gas over-expansion and control the wellbore pressure timely, diagnostic methods based on downhole measurement techniques were the main development direction of kick detection in the early stage. However, the applicability and time efficiency of those methods are quite limited in the kick detection in horizontal wells. Firstly, since gas doesn't expand when it migrates in a horizontal section, the flow and pressure variations are not apparent, and it is difficult to measure directly to realize early identification. Secondly, since a risk of formation fluid invasion exists at all positions in a horizontal section, it is unable to judge the kick information above the bottom hole based on the measurement data obtained at the bottom hole. Finally, since the pressure variations are not apparent, it is difficult to judge the kick information, etc timely. However, the identification of kick fluid type, kick rate, and kick occurrence position has important meaning in understanding about the formation characteristics, judging the causes for kick, and conducting follow-up wellbore pressure control.

To overcome the drawbacks in the prior art, the present invention provides a measuring unit, a kick information identification apparatus and method, which are applicable to kick information identification in horizontal wells.

SUMMARY OF THE INVENTION

The object of the present invention is to provide a measuring unit, a kick information identification apparatus, and a kick information identification method, which can be used to identify kick information in horizontal wells by utilizing a throttling device and pressure sensors and/or temperature sensors.

To attain the object described above, in an embodiment of the present invention, a measuring unit for kick information identification is provided, comprising: a throttling device, mounted on a drill stem; sensors, arranged at the two sides of the throttling device, and configured to sense the pressure and/or temperature at the two sides of the throttling device; and a signal transmitter, configured to transmit the pressure and/or temperature values.

Optionally, the throttling device is a multi-stage throttling device.

Optionally, the signal transmitter is a wireless communication module; and the measuring unit further comprises a power supply unit configured to supply power to the measuring unit.

Accordingly, in an embodiment of the present invention, a kick information identification apparatus is provided, comprising: the measuring units described above; and a processor, configured to determine kick information according to the pressure and/or temperature at the two sides of the throttling device, the kick information comprises one or more of the following items: kick moment, kick rate, kick occurrence position, and kick type.

Optionally, when the pressure drop across the throttling device at the current moment is greater than the pressure drop at the previous moment by a value greater than a preset pressure drop, the processor determines the current moment as the kick moment.

Optionally, the processor calculates the drilling fluid flow corresponding to the pressure drop across the throttling device, and takes the difference between the drilling fluid flow and the current drilling fluid injection displacement as the kick rate.

Optionally, the processor determines the kick occurrence position according to the following equation:

$$L_1 = \frac{Q_1(t_1 - t_0)}{A}$$

where, $L_1$ represents the distance of the kick occurrence position from the measuring unit, $Q_1$ is the fluid flow rate through the throttling device corresponding to the pressure drop in the throttling device, $t_0$ is the kick moment, $t_1$ is the moment when the temperature sensor in the measuring unit detects that the temperature rising rate is greater than the preset temperature rising rate, and A is the sectional area of the annulus.

Optionally, the processor calculates a pressure-drop coefficient with the following equation, and determines the kick type according to the pressure-drop coefficient:

$$x = \frac{\Delta p_2 - \Delta p_0}{\Delta p_1 - \Delta p_0}$$

where, x is the pressure-drop coefficient; $\Delta p_0$ is the pressure drop in the throttling device before kick; $\Delta p_1$ is the pressure drop at the moment before the kick fluid reaches to the throttling device after kick, $\Delta p_1 - \Delta p_0$ is the increment of the corresponding pressure drop; $\Delta p_2$ is the pressure drop at the moment after the kick fluid reaches to the throttling device after kick, and $\Delta p_2 - \Delta p_0$ is the increment of the corresponding pressure drop.

Optionally, the processor determines the kick fluid to be a gas, if the temperature difference across the throttling device is a negative value.

Accordingly, in an embodiment of the present invention, a kick information identification method is provided, comprising: sensing the pressure and/or temperature at the two sides of a throttling device on a drill stem; and determining kick information according to the pressure and/or temperature at the two sides of the throttling device, wherein the kick information comprises one or more of the following items: kick moment, kick rate, kick occurrence position, and kick type.

The present invention employs a throttling device and measures the pressure drop and/or temperature difference across the throttling device, and can identify kick information successfully according to the pressure drop and/or temperature difference. Even in the case of horizontal wells where the flow and pressure variations are not apparent, the present invention can still attain a good kick information identification effect. In addition, besides monitoring kick, the throttling device can also be used to increase pressure loss by means of throttling and pressure drop by means of friction resistance to avoid vehement kick development, and can assist wellbore pressure control on the basis of the kick information.

Other features and advantages of the present invention will be further detailed in the embodiments hereunder.

DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. Among the drawings.

| Description of the Symbols | | | |
|---|---|---|---|
| 1 | First measuring unit | 2 | Second measuring unit |
| 3 | Drill bit | 4 | Drill stem |
| 5 | Oil-gas reservoir | 6 | Casing |
| 7 | Cement annulus | 8 | Lower ram-type blowout preventer |
| 9 | Hydraulic throttle valve | 10 | Cutter ram-type blowout preventer |
| 11 | Upper ram-type blowout preventer | 12 | Annular blowout preventer |
| 13 | Throttling device | 14, 17 | Pressure sensor |
| 15, 16 | Temperature sensor | 19 | Power supply unit |
| 20 | Signal transmitter | 21 | Rock debris flow-back hole |
| 22 | Wellbore wall | | |

DETAILED DESCRIPTION OF THE EMBODIMENTS

Hereunder some embodiments of the present invention will be detailed with reference to the accompanying drawings. It should be appreciated that the embodiments described here are only provided to describe and explain the present invention, but shall not be deemed as constituting any limitation to the present invention.

Figure 1:
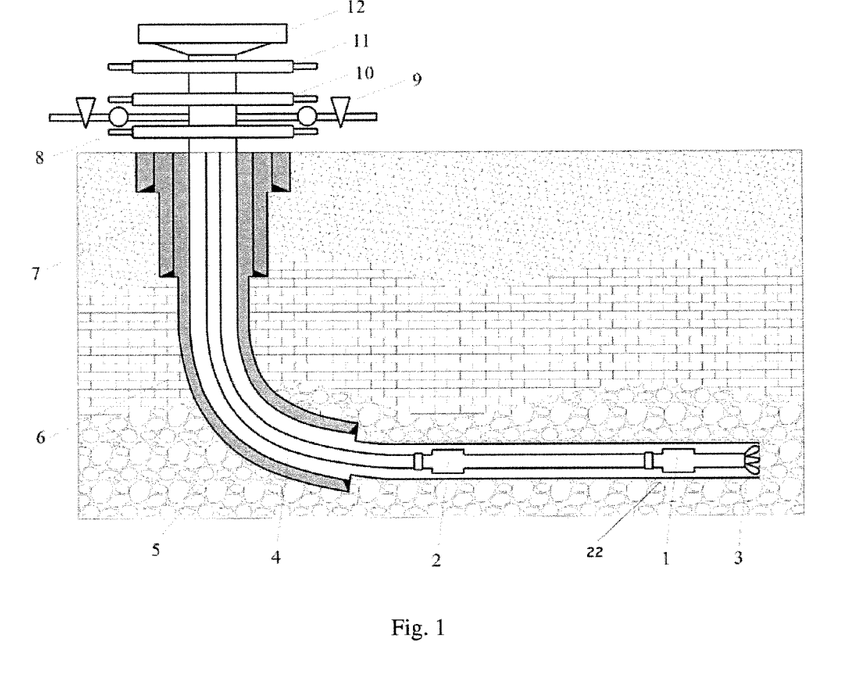
FIG. 1 is a schematic diagram of the mounting positions of the measuring units for kick information identification according to an embodiment of the present invention.

FIG. 1 is a schematic diagram of the mounting positions of the measuring units for kick information identification according to an embodiment of the present invention. As shown in FIG. 1, during horizontal well drilling operation, two measuring units are mounted on a drill stem 4. The measuring unit 1 may be mounted at about 20 m behind a drill bit 3 on the drill stem 4. Certainly, the number of measuring units mounted on the drill stem is not limited to 2 measuring units; a different number of measuring units is also permitted.

Figure 2:
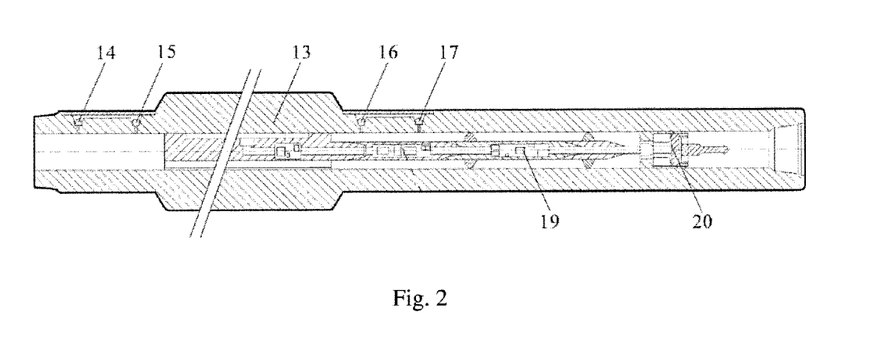
FIG. 2 is a schematic structural diagram of the measuring unit for kick information identification according to the embodiment of the present invention.

FIG. 2 is a schematic structural diagram of the measuring unit for kick information identification according to the embodiment of the present invention. As shown in FIG. 2, the measuring unit comprises: a throttling device 13, mounted on the drill stem 4; sensors, arranged at the two sides of the throttling device 13, and configured to sense the pressure and/or temperature at the two sides of the throttling device (FIG. 2 shows pressure sensors 14 and 17 and temperature sensors 15 and 16 mounted at the two sides of the throttling device respectively); and a signal transmitter, configured to transmit the pressure and/or temperature values, wherein, the signal transmitter may be a wireless communication module, in order to avoid wiring of signal wire on the drill stem 4 for transmitting the pressure and/or temperature values. In addition, the measuring unit may further comprises a power supply unit 18 configured to supply power to the electrical components in the measuring units and avoid wiring of a power cord on the drill stem 4.

Figure 3A:
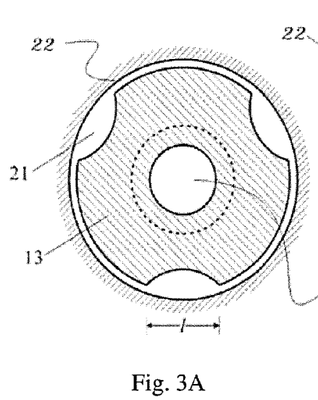
FIGS. 3A and 3B are longitudinal and transverse axial sectional views of the throttling device in the measuring unit for kick information identification according to the embodiment of the present invention, respectively.
Figure 3B:
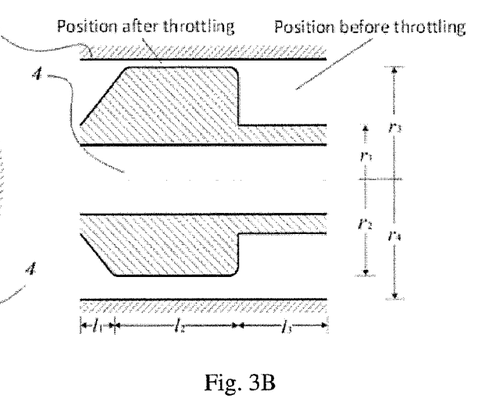
Figure 4:
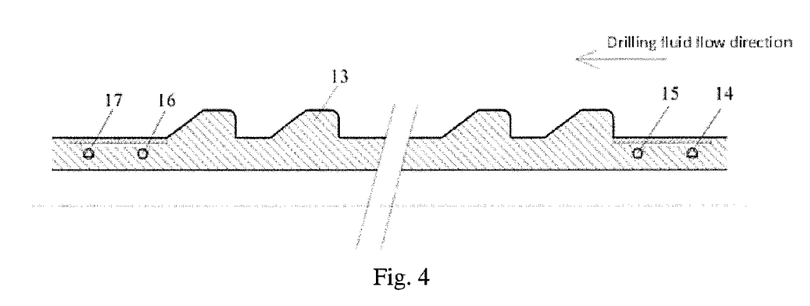
FIG. 4 is a sectional view of a multi-stage throttling device.

FIGS. 3A and 3B are longitudinal and transverse axial sectional views of the throttling device in the measuring unit for kick information identification according to the embodiment of the present invention, respectively. As shown in FIGS. 3A and 3B, the throttling device 13 is mounted on the drill stem 4, and the throttling device 13 are foimed with three rock debris flow-back holes 21 in an annulus formed between the drill stem 4 and the wellbore wall 22, to ensure normal flow-back of rock debris. In addition, through the radii of different protrusion parts of the throttling device 13 (e.g., radii $r_1$-$r_3$ shown in FIG. 3B), the throttling device 13 can change the area of passage in the annulus, so as to produce pressure drop by means of friction resistance and throttling. Preferably, the throttling device 13 comprises a plurality of throttling parts, and is a multi-stage throttling device, so as to produce enough pressure drop, as shown in FIG. 4.

In the case of gas-liquid dual-phase flow, theoretically the pressure drop across the throttling device is equal to the sum of the pressure drop incurred by friction resistance and the pressure drop incurred by throttling:

$$\Delta p = \Delta p_f + \Delta p_J \quad (1)$$

where, the pressure drop incurred by friction resistance and the pressure drop incurred by throttling are:

$$\Delta p_f = \int_0^L f \frac{u_m^2}{2dv_m} dx \quad (2)$$

$$\Delta p_J = M(p_1 - p_2) \quad (3)$$

$$\frac{u_{m2}^2 - u_{m1}^2}{2} = \frac{n x_g v_{g1} p_1}{n-1}\left[1 - \left(\frac{p_2}{p_1}\right)^{\frac{n-1}{n}}\right] + (1 - x_g)v_L(p_1 - p_2) \quad (4)$$

$$n = \frac{x_g k C_{vg1} + (1-x_g)C_L}{x_g C_{vg1} + (1-x_g)C_L}, \quad k = \frac{C_{pg1}}{C_{vg1}} \quad (5)$$

where, L is the length of the multi-stage throttling device; d is the equivalent diameter of the annulus; f is a friction coefficient; M is the number of stages of the multi-stage throttling device; $x_g$ is the mass fraction of the gas phase; p is the pressure; v is the specific volume; $C_{pg}$ is specific heat capacity of the gas at a constant pressure; $C_{vg}$ is the specific heat capacity of the gas at a constant volume; u is the flow velocity. The suffix g represents gas phase, the suffix L represents liquid phase, the suffix m represents a mixture of kick fluid (oil, gas, water) and mud; the suffix 1 represents the position before throttling, and the suffix 2 represents the position after throttling, as shown in FIG. 3B.

In the initial stage of kick, before the kick fluid reaches to the throttling device, only the drilling fluid flow exits at the throttling device. The pressure drop across the throttling device is:

$$\Delta p = \sum_i f \frac{Q^2 l_i}{2 v_L d_i A_i^2} + M \frac{Q^2}{2 v_L}\left(\frac{1}{A_2^2} - \frac{1}{A_1^2}\right) \quad (6)$$

$$A_1 = \pi(r_4^2 - r_1^2) \quad (7)$$

$$A_2 = 3A_{cut} + \pi(r_3 + r_4)x_{marg} \quad (8)$$

where, Q is the flow of the fluid flowing through the throttling device; $A_1$ is the cross-sectional area of the annulus before throttling; $A_2$ is the cross-sectional area of the annulus after throttling; $A_{cut}$ is the sectional area of the rock debris flow-back hole; $x_{marg}$ is the fitting margin between the throttling device and the wellbore wall, $x_{marg} = r_4 - r_3$; $l_i$ is the length of the section i of the throttling device; $r_1$-$r_4$ are the radii of the sections of the throttling device, as shown in FIG. 3B.

Particularly, for a 5-⅞-in wellbore, for example, the number of stages of the throttling device is 20, the length of the throttling device is 6.096 m, and the geometric parameters are as follows:

TABLE 1

Geometric Parameters of the Throttling Device

| Radius | Value | Length | Value |
|---|---|---|---|
| $r_1$ | 30.8 mm | l | 35 mm |
| $r_2$ | 55.6 mm | $l_1$ | 50.8 mm |
| $r_3$ | 69.6 mm | $l_2$ | 152.4 mm |
| $r_4$ | 74.6 mm | $l_3$ | 101.6 mm |

Figure 5:
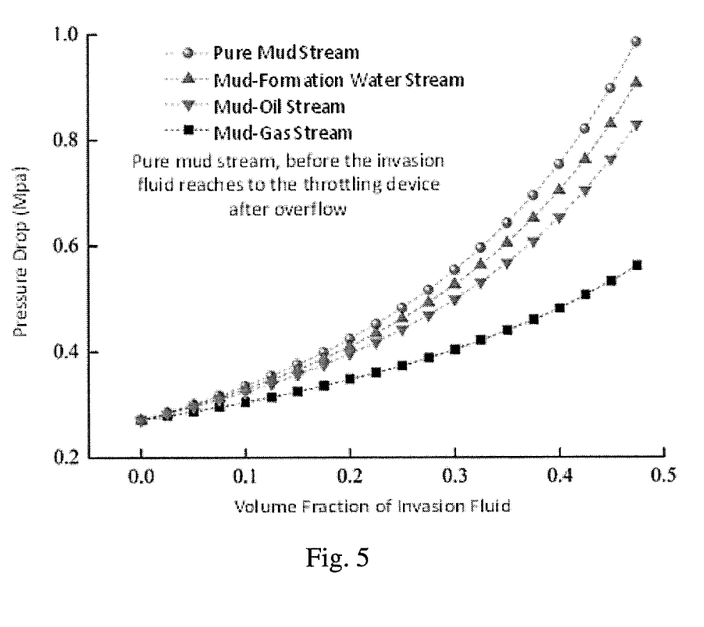
FIG. 5 is a schematic relation curve diagram between pressure drop across the throttling device before different types of kick fluids reach to and after the throttling device (i.e., pressure difference before and after throttling) and kick fluid volume fraction after kick happens.

Suppose the parameters of the drilling fluid and the kick fluid are those shown in Table 2, the calculated pressure drop across the multi-stage throttling device is shown in FIG. 5.

TABLE 2

Calculated Simulation Parameters

| Variable | Value | Variable | Value |
|---|---|---|---|
| Displacement of the drilling fluid | 15 L/s | Density of the drilling fluid | 1200 kg/m³ |
| Specific heat capacity of drilling fluid | 1872 J/(kg • K) | Density of the gas | 117.86 kg/m³ |
| Specific heat capacity of the gas at a constant pressure | 3148 J(kg • K) | Specific heat capacity of the gas at a constant volume | 1950 J/(kg • K) |
| Density of formation water | 1000 kg/m³ | Density of formation oil | 800 kg/m³ |
| Pressure at the inlet | 20 MPa | Temperature at the inlet | 80° C. |
| Type of the gas | CH₄ | Friction coefficient | 0.01 |

FIG. 5 is a schematic relation curve diagram between pressure drop across the throttling device before different types of kick fluids reach to and pass through the throttling device and kick fluid volume fraction after kick happens. The curve labeled as "pure mud stream" represents the variation of the pressure drop measured across the throttling device vs. the volume fraction of the fluid invading into the annulus before the kick fluid reaches to the throttling device, after kick happens; the curve labeled as "mud-formation water stream" represents the variation of the pressure drop measured across the throttling device vs. the volume fraction of the fluid invading into the annulus after the kick fluid reaches to the throttling device after kick happens, in the case that the kick fluid is a "formation water stream"; the curve labeled as "mud-oil stream" represents the variation of the pressure drop measured across the throttling device vs. the volume fraction of the fluid invading into the annulus after the kick fluid reaches to the throttling device after kick happens, in the case that the kick fluid is an "oil stream"; the curve labeled as "mud-gas stream" represents the variation of the pressure drop measured across the throttling device vs. the volume fraction of the fluid invading into the annulus after the kick fluid reaches to the throttling device after kick happens, in the case that the kick fluid is a "gas stream".

It can be seen from FIG. 5: as the volume fraction of the fluid invading into the annulus increases, the pressure drop measured across the throttling device increases remarkably. At the initial time, for the "pure mud stream" curve, under the condition of normal drilling fluid displacement, the measured pressure drop is 0.271 MPa; when the volume fraction of the kick fluid reaches 40% or a higher value, the pressure drop increases rapidly to 0.754 MPa. Thus, the occurrence of kick can be diagnosed and the kick rate can be determined quickly according to that characteristic.

In addition, it can be seen from FIG. 5: the pressure drop across the multi-stage throttling device is very sensitive to the kick type. In the case that the volume fraction of the kick fluid reaches 40% as described above, the pressure drop is 0.704 MPa, 0.653 MPa, and 0.481 MPa respectively when three different types of kick fluids ("formation water stream", "oil stream" and "gas stream") flow through the throttling device respectively. Calculated with the following equation (9), the pressure-drop coefficients corresponding to oil, gas, and water invasion types are 89.65%, 79.09%, and 43.48% respectively. Thus, the kick rate and kick type can be identified.

$$x = \frac{\Delta p_2 - \Delta p_0}{\Delta p_1 - \Delta p_0} \quad (9)$$

where, x is the pressure-drop coefficient; $\Delta p_0$ is the pressure drop before kick; $\Delta p_1$ is the pressure drop at the moment before the kick fluid reaches to the multi-stage throttling device after kick, $\Delta p_1 - \Delta p_0$ is the increment of the corresponding pressure drop; $\Delta p_2$ is the pressure drop at the moment after the kick fluid reaches to the multi-stage throttling device after kick, and $\Delta p_2 - \Delta p_0$ is the increment of the corresponding pressure drop.

The present invention further provides a kick information identification apparatus, comprising: one or more measuring units described above, configured to acquire pressure and/or temperature at the two sides of a throttling device and transmit the data via a signal transmitter; and a processor, arranged on the ground surface, for example, and configured to receive the pressure and/or temperature data at the two sides of the throttling device transmitted from the measuring units, and determine kick information according to the pressure and/or temperature at the two sides of the throttling device on the basis of the characteristic described above, wherein, the kick information includes one or more of the following items: kick moment, kick rate, kick occurrence position, and kick type, and thereby provide a kick warning accordingly.

For a multi-stage throttling device, theoretically the pressure drop under the condition of single phase fluid flow can be calculated with the equation (6). In view that the theoretically calculated value may not be accurate enough, empirical coefficients are fitted according to the test data, and an empirical relation formula of pressure drop vs. displacement of liquid phase flow at each measuring unit is determined:

$$\Delta p = \frac{a_1 Q^{a_2}}{v_L} + a_3 N \frac{Q^2}{2v_L} \left( \frac{1}{A_2^2} - \frac{1}{A_1^2} \right) \quad (10)$$

where, $a_1$, $a_2$, $a_3$ are empirical coefficients, which are mainly related to the parameters of the throttling device; Q is the fluid flow through the throttling device, m³/s; $A_1$, $A_2$ are sectional areas of the annulus before and after throttling, m³.

Before kick information identification, the drilling fluid may be injected in different drilling fluid injection displacements, and the pressure drops $\Delta p$ of the measuring unit under different drilling fluid injection displacements are recorded. The empirical coefficients in the equation (10) can be determined by putting the recorded different groups of displacement —pressure drop values into the equation (10), so that the empirical coefficients can be utilized subsequently to calculate the kick rate with the equation (10).

Hereunder the specific methods for determining the kick moment, kick rate, kick occurrence position, and kick type will be described.

1) Judging Kick Occurrence Moment

The propagation velocity of a pressure wave in mud is as high as about 1,500 m/s. Hence, the propagation time of the pressure wave may be neglected, and the initial kick time recorded by the pressure sensor may be supposed as the true initial kick time.

Thus, the pressure drop $\Delta p_1$ across the throttling device in the measuring unit can be recorded in real time. If the $\Delta p_1$ increases remarkably compared with its value at the previous moment (e.g., the difference between the pressure drop values at the two moments exceeds a preset pressure drop value), it can be judged preliminarily that kick has happened; in that case, the kick occurrence moment is recorded and denoted by $t_0$.

2) Calculating Kick Rate

According to the pressure drop $\Delta p_1$ across the throttling device in the measuring unit, the equation (10) is utilized to calculate the corresponding fluid flow rate $Q_1$ through the throttling device, and the kick rate $\Delta Q_1$ can be determined according to the fluid flow rate and the drilling fluid injection displacement.

$$\Delta Q_1 = Q_1 - Q_0, \quad (11)$$

where, $Q_0$ is the drilling fluid injection displacement.

3) Judging Kick Occurrence Position

After kick happens, the hot formation fluid invades into the wellbore and cause fluid temperature rising in the wellbore. Suppose that the heat conduction velocity is neglected, usually the temperature propagation velocity is approximately equal to the migration velocity of the kick fluid.

Therefore, after the hot formation fluid migrates to the measuring unit, the temperature recorded by the temperature sensor will rise apparently (e.g., the temperature rising rate is higher than a preset temperature rising rate); in addition, if the kick fluid is a gas, the pressure difference between the two ends of the throttling device will decrease obviously. The moment $t_1$ when the temperature begins to rise and/or the pressure decreases obviously is recorded, and the kick may happen at the following position $L_1$ from the measuring unit:

$$L_1 = \frac{Q_1(t_1 - t_0)}{A} \quad (12)$$

where, A is the sectional area of the annulus.

4) Judging Kick Type

When the formation fluid migrates to the measuring unit and flows through the multi-stage throttling device, if the formation fluid is oil or water, the difference between the pressure drop $\Delta p_1$ across the multi-stage throttling device at the current moment and that at the previous moment is not great (it can be seen from FIG. 5: the pressure-drop coefficient is slightly greater than 75%); if the formation fluid is a gas, the pressure drop $\Delta p_1$ across the multi-stage throttling device at the current moment is obviously lower than that at the previous moment (it can be seen from FIG. 5: the pressure-drop coefficient is slightly less than 50%). Therefore, besides monitoring kick, the designed multi-stage throttling device can also increase the pressure loss by means of throttling and pressure drop by means of friction resistance, and thereby avoid rapid kick growth.

The method described above judges the type of the kick fluid by comparing the pressure drop across the multi-stage throttling device before and after the kick fluid reaches to the multi-stage throttling device. Alternatively, the type of the kick fluid can be judged according to the temperature change between the temperature before and after throttling.

The temperature change between the temperature before and after throttling may be calculated with the following equation (12):

$$\Delta T = \mu_J \Delta p \qquad (12)$$

where, $\mu_J$ is the throttling coefficient. In the case that the throttled fluid is a gas, the throttling coefficient $\mu_J$ is a positive value, since gas usually has high compressibility, and the temperature drop after throttling is obvious; in the case that the throttled fluid is a liquid, the throttling coefficient $\mu_J$ is a negative value and close to 0, such that the temperature of the liquid after throttling basically has not change or slightly rise.

In summary, after the occurrence of kick is ascertained (i.e., the pressure drop across the throttling device increases remarkably), if the pressure drop and/or temperature difference across the throttling device in the measuring unit doesn't change greatly, it indicates that the kick fluid is oil or water; in contrast, if the temperature difference is negative and the pressure drop is obvious, it indicates that the kick fluid is a gas.

Figure 6:
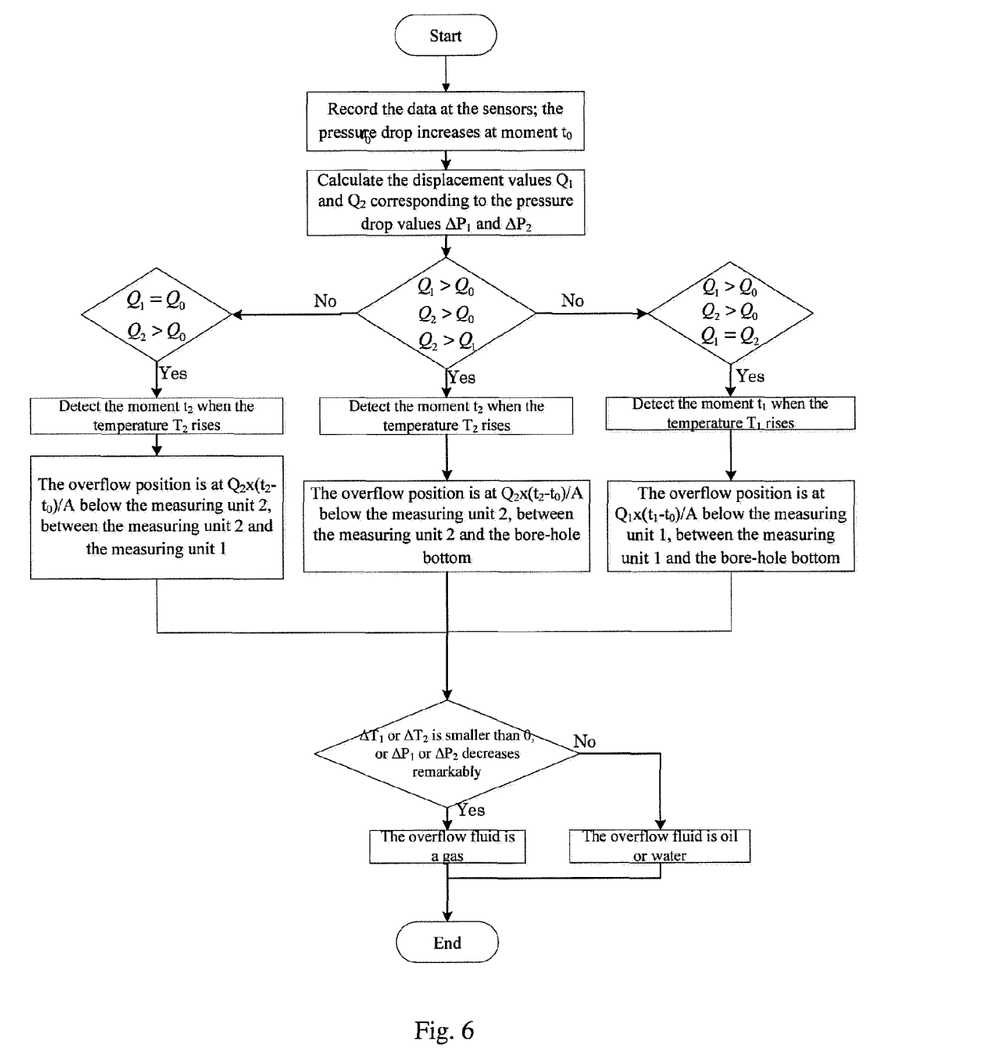
FIG. 6 is a flow chart of the kick information identification process according to the embodiment of the present invention.

FIG. 6 is a flow chart of the kick infatuation identification process according to the embodiment of the present invention, illustrating a scenario that two measuring units are arranged on the drill stem as shown in FIG. 1.

Firstly, the measurement data of the temperature sensors and pressure sensors at the two sides of the measuring units 1 and 2 is recorded. If it is found that the pressure drop across the throttling device in the measuring unit 1 or 2 increases remarkably at a moment $t_0$, it indicates that kick has happened, and that moment $t_0$ can be determined as the kick occurrence moment. Then, the values of fluid flow rates $Q_1$, $Q_2$ through the corresponding throttling devices are calculated according to the values of pressure drop $\Delta P_1, \Delta P_2$ across the throttling devices in the measuring units 1 and 2, wherein, $\Delta P_1$ corresponds to the pressure drop across the throttling device in the measuring unit 1, $\Delta P_2$ corresponds to the pressure drop across the throttling device in the measuring unit 2, $Q_1$ corresponds to the fluid flow rate through the throttling device in the measuring unit 1, and $Q_2$ corresponds to the fluid flow rate through the throttling device in the measuring unit 2. Next, the fluid flow rate values $Q_1$, $Q_2$ and the drilling fluid injection displacement $Q_0$ are compared.

If $Q_1 = Q_0$ and $Q_2 > Q_0$, it indicates that the kick happens between the measuring unit 2 and the measuring unit 1; in that case, the moment $t_2$ when the temperature $T_2$ rises at the measuring unit 2 is detected, and the kick occurrence position is determined as the position $Q_2 \times (t_2 - t_0)/A$ below the measuring unit 2 through calculation. The term "below" mentioned here and in the following text refers to downstream in the drill stem extension direction.

If $Q_1 > Q_0$, $Q_2 > Q_0$ and $Q_1 = Q_2$, it indicates that the kick happens between the measuring unit 1 and the bore-hole bottom (i.e., at the position of the drill bit); in that case, the moment $t_1$ when the temperature $T_1$ rises at the measuring unit 1 is detected, and the kick occurrence position is determined as the position $Q_1 \times (t_1 - t_0)/A$ below the measuring unit 1 through calculation.

If $Q_1 > Q_0$, $Q_2 > Q_0$ and $Q_2 > Q_1$, it indicates that the kick happens between the measuring unit 2 and the measuring unit 1 and between the measuring unit 1 and the bore-hole bottom, and the kick occurrence positions may be at a single kick point between the measuring unit 2 and the measuring unit 1 and at a single kick point between the measuring unit 1 and the bore-hole bottom, or the kick may happen in a continuous kick region that covers a position between the measuring unit 2 and the measuring unit 1 and a position between the measuring unit 1 and the bore-hole bottom. In that case, the moment $t_2$ when the temperature $T_2$ rises at the measuring unit 2 can be detected, and the kick occurrence position can be determined as a position $Q_2 \times (t_2 - t_0)/A$ below the measuring unit 2 through calculation. In view that the case described above is complex, herein only the method for determining a kick occurrence position near the measuring unit 2 will be described.

Next, the type of the kick fluid can be judged according to whether the temperature difference $\Delta T_1$ between the two sides of the throttling device in the measuring unit 1 or the temperature difference $\Delta T_2$ between the two sides of the throttling device in the measuring unit 2 is smaller than 0 and whether $\Delta P_1$ or $\Delta P_2$ decreases remarkably. If the temperature difference $\Delta T_1$ between the two sides of the throttling device in the measuring unit 1 or the temperature difference $\Delta T_2$ between the two sides of the throttling device in the measuring unit 2 is smaller than 0 or $\Delta P_1$ or $\Delta P_2$ decreases remarkably, the kick fluid can be judged as a gas; otherwise the kick fluid can be judged as a liquid, such as oil or water.

After the kick information is obtained, well shutdown operation is conducted (specifically, the well shutdown operation includes: open the hydraulic throttle valve 9; then, close the annular blowout preventer 12; next, close the upper ram type blowout preventer 11 and lower ram type blowout preventer 8, but don't close the cutter ram-type blowout preventer 10); next, well killing operation is conducted; particularly, by adjusting the well killing rate, the throttling device can assist wellbore pressure control.

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Those skilled in the art can appreciate that all or a part of the steps constituting the method in the above-mentioned embodiment can be implemented by instructing relevant hardware with a program, which is stored in a storage medium and includes several instructions to instruct a single-chip microcomputer, a chipset, or a processor to execute all or a part of the steps of the methods in the embodiments of the present application. The storage medium comprises: U-disk, removable hard disk, Read-Only Memory (ROM), Random Access Memory (RAM), diskette, or CD-ROM, or a similar medium that can store program codes.

Moreover, different embodiments of the present invention can be combined freely as required, as long as the combinations don't deviate from the ideal and spirit of the present invention. However, such combinations shall also be deemed as falling into the scope disclosed in the present invention.

What is claimed is:

1. A kick information identification apparatus for wellbore pressure control during horizontal drilling, comprising:
a measuring unit, comprising:
a throttling device, mounted on a drill stem;
pressure sensors, arranged at two sides of the throttling device, and configured to constantly sense pressure and to output pressure data;
temperature sensors, arranged at two sides of the throttling device, and configured to constantly sense temperature and to output temperature data; and
a signal transmitter, configured to constantly transmit the sensed pressure and temperature data from the pressure and temperature sensors to a processor; and
the processor, configured to perform a kick information identification method, wherein the kick information comprises one or more of the following items: a kick moment, a kick rate, a kick occurrence position, and a kick type, where the kick information identification method comprises the following steps:
providing the throttling device on the drill stem;
providing the pressure sensors at two sides of the throttling device for sensing pressure;
providing the temperature sensors at two sides of the throttling device for sensing temperature;
constantly sensing, by the pressure and temperature sensors, pressure and temperature at the two sides of the throttling device;
constantly transmitting, by the signal transmitter, the sensed pressure and temperature data from the pressure and temperature sensors to the processor;
repetitively monitoring, by the processor, pressure drops in the throttling device based on the sensed pressure data;
repetitively determining, by the processor, a fluid flow rate $Q_1$ through the throttling device corresponding to the monitored pressure drops in the throttling device;
repetitively monitoring, by the processor, a temperature rising rate based on the sensed temperature data;
determining, by the processor, a kick moment $t_0$ based on the monitored pressure drops;
determining, by the processor, a moment $t_1$ when the temperature rising rate is greater than a preset temperature rising rate;
determining, by the processor, a distance $L_1$ of the kick occurrence position from the measuring unit, wherein $$L_1 = \frac{Q_1(t_1 - t_0)}{A}$$

where, A is a sectional area of an annulus.

2. The apparatus according to claim 1, wherein, the throttling device is a multi-stage throttling device.

3. The apparatus according to claim 1, wherein,
the signal transmitter is a wireless communication module; and
the measuring unit further comprises a power supply unit configured to supply power to the measuring unit.

4. The apparatus according to claim 1, wherein, when a pressure drop across the throttling device at a current moment is greater than a pressure drop at a previous moment by a value greater than a preset pressure drop, the processor determines the current moment as the kick moment.

5. The apparatus according to claim 1, wherein, the processor calculates a drilling fluid flow corresponding to a pressure drop across the throttling device, and takes a difference between the drilling fluid flow and a current drilling fluid injection displacement as the kick rate.

6. The apparatus according to claim 1, wherein, the processor determines the kick fluid to be a gas, if the temperature difference across the throttling device is a negative value.

7. A kick information identification apparatus for wellbore pressure control during horizontal drilling, comprising:
a measuring unit, comprising:
a throttling device, mounted on a drill stem;
pressure sensors, arranged at two sides of the throttling device, and configured to constantly sense pressure and to output pressure data;
temperature sensors, arranged at two sides of the throttling device, and configured to constantly sense temperature and to output temperature data; and
a signal transmitter, configured to constantly transmit the sensed pressure and temperature data from the pressure and temperature sensors to a processor; and
the processor, configured to perform a kick information identification method, wherein the kick information comprises one or more of the following items: a kick moment, a kick rate, a kick occurrence position, and a kick type, where the kick information identification method comprises the following steps:
providing the throttling device on the drill stem;
providing the pressure sensors at two sides of the throttling device for sensing pressure;
providing the temperature sensors at two sides of the throttling device for sensing temperature;
constantly sensing, by the pressure and temperature sensors, pressure and temperature at the two sides of the throttling device;
constantly transmitting, by the signal transmitter, the sensed pressure and temperature data from the pressure and temperature sensors to the processor;
repetitively monitoring and storing, by the processor, pressure drops in the throttling device based on the sensed pressure data;
determining, by the processor, a kick based on the monitored pressure drops;
monitoring
determining, by the processor, a pressure drop coefficient x, wherein $$x = \frac{\Delta p_2 - \Delta p_0}{\Delta p_1 - \Delta p_0}$$

where, $\Delta p_0$ is a pressure drop in the throttling device before the kick; $\Delta p_1$ is a pressure drop at a moment before the kick fluid reaches to the throttling device after the kick, $\Delta p_1 - \Delta p_0$ is an increment of the corresponding pressure drop; $\Delta p_2$ is a pressure drop at a moment after the kick fluid reaches to the throttling device after kick, and $\Delta p_2 - \Delta p_0$ is an increment of the corresponding pressure drop;

determining, by the processor, a kick type according to the pressure-drop coefficient x.

8. The apparatus according to claim 7, wherein, the throttling device is a multi-stage throttling device.

9. The apparatus according to claim 7, wherein,
the signal transmitter is a wireless communication module; and
the measuring unit further comprises a power supply unit configured to supply power to the measuring unit.

10. The apparatus according to claim 7 wherein, when a pressure drop across the throttling device at a current moment is greater than a pressure drop at a previous moment by a value greater than a preset pressure drop, the processor determines the current moment as the kick moment.

11. The apparatus according to claim 7, wherein, the processor calculates a drilling fluid flow corresponding to a pressure drop across the throttling device, and takes a difference between the drilling fluid flow and a current drilling fluid injection displacement as the kick rate.

12. The apparatus according to claim 7, wherein, the processor determines the kick fluid to be a gas, if the temperature difference across the throttling device is a negative value.

* * * * *